United States Patent [19]
Paul et al.

[11] Patent Number: 5,424,018
[45] Date of Patent: Jun. 13, 1995

[54] VARIABLE WIDTH DIE AND METHOD FOR EXTRUDING SHEET PRODUCTS

[75] Inventors: William C. Paul; Robert Bourne, both of Mt. Vernon, Ind.

[73] Assignee: General Electric Company, Pittsfield, Mass.

[21] Appl. No.: 181,285

[22] Filed: Jan. 13, 1994

[51] Int. Cl.⁶ .................................. B29C 47/16
[52] U.S. Cl. ........................ 264/176.1; 264/40.7; 264/177.16; 264/323; 425/188; 425/192 R; 425/466
[58] Field of Search .......... 264/176.1, 177.16, 323, 264/40.7, 237; 425/466, 381, 461, 192 R, 188, 140, 465

[56] References Cited

U.S. PATENT DOCUMENTS

| | | | |
|---|---|---|---|
| 3,093,860 | 6/1963 | Eilersen | 425/466 |
| 3,112,527 | 12/1963 | Pankratz et al. | 425/466 |
| 3,293,689 | 12/1966 | Chiselko et al. | 425/466 |
| 3,320,634 | 5/1967 | Ryan et al. | 425/466 |
| 3,647,346 | 3/1972 | Minnie | 264/176.1 |
| 3,829,274 | 8/1974 | Melead | 425/466 |
| 4,248,579 | 2/1981 | Maejima | 264/176.1 |
| 4,292,019 | 9/1981 | Hay et al. | 264/177.16 |
| 4,944,666 | 7/1990 | Hilke et al. | 264/177.16 |
| 5,292,463 | 3/1994 | Paul | 264/40.7 |

FOREIGN PATENT DOCUMENTS 5-00076  1/1993  Japan ............................. 425/466

Primary Examiner—Jeffery R. Thurlow

[57] ABSTRACT

An apparatus and method for controlling in a variably controllable fashion the width of an extruder die opening whereby the width of material being extruded may be controllably varied.

10 Claims, 6 Drawing Sheets

VARIABLE WIDTH DIE AND METHOD FOR EXTRUDING SHEET PRODUCTS

FIELD OF THE INVENTION

The present invention relates to an apparatus for extruding plastics and other extrudable materials. More particularly, the present invention relates to an apparatus for preparing plastic sheet. Most particularly, the present invention relates to an apparatus for extruding molten plastic resins to provide plastic sheets of variable width.

BACKGROUND OF THE INVENTION

The process of extruding plastics to form a wide variety of articles of manufacture is well established technology. Extrusion has been is utilized to produce sheets, films, pellets, wire and cable coatings, and useful articles. Typically, a plastic material is fed to an extruder wherein the temperature is raised above the glass transition temperature of the plastic such that the plastic will flow either because it is molten or because a mechanical stress has been applied. The molten plastic is mechanically forced through a shaping or extrusion die under a positive pressure or force.

A significant drawback associated with the extrusion of sheets of different widths is the need to change the extrusion dies when it is desired to vary the width of the plastic sheet being extruded. Removing the die and replacing it with a new die of different dimensions has proved to be cumbersome and cause a significant amount of downtime on the extruders where such change in width was necessary. It has also been necessary to stockpile dies of varying widths in order to satisfy the demands of the marketplace for sheets of varying widths.

The use of an adjustable deckle or frame has been disclosed in the art to facilitate altering the width of the die and the extruded article. For example, Ryan et al. in U.S. Pat. No. 3,320,634 disclose the use of adjustable deckle plates to change the configuration of the die. Chiselko et al. in U.S. Pat. No. 3,293,689 teach the use of tracks to move deckle bars in order to regulate the width of extruded sheets. Another patent disclosing the use of adjustable deckles is Melead in U.S. Pat. No. 3,829,274.

SUMMARY OF THE INVENTION

The present invention provides a means for varying the width of extruded plastic sheet without the need for changing the extrusion die and also without the need to use a decide. According to the present invention there is provided a novel extrusion die apparatus comprising an elongated die body, at least one inlet into said die body, an extruder die opening, and side blocking plates containing a pivotally mounted member wherein said pivotally mounted member pivots around a pivot point within said side blocking plate and extends into the die cavity reducing the width of the extruder die opening by the amount of its lateral extension into the die cavity and extruder die opening, reducing said extruder die opening width in a controllably variable fashion.

Also according to the present invention there is provided a method of varying the width of an extruded sheet comprising extruding a molten plastic through an extruder equipped with an extrusion die body having both a right and left side blocking plate wherein both blocking plates are equipped with a pivotally mounted member.

Figure 1:
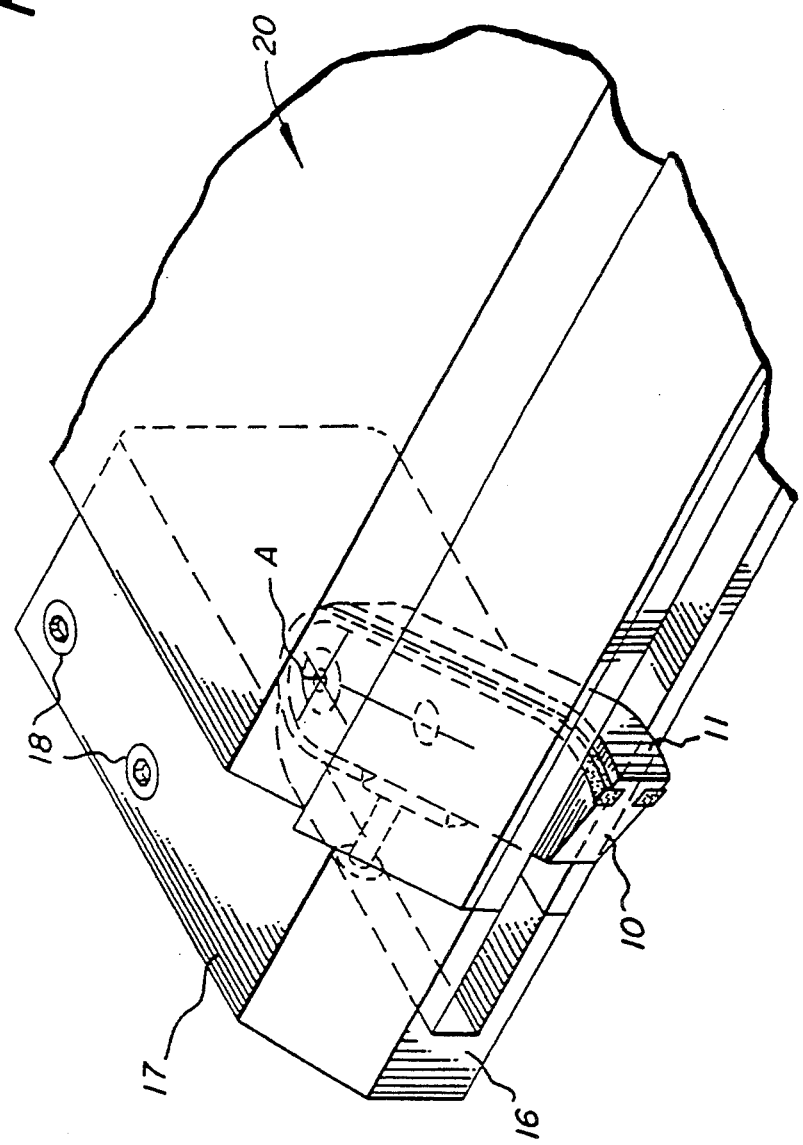
FIG. 1 Perspective drawing of the left hand blocking plate with pivotally mounted arm partially extended.
Figure 2:
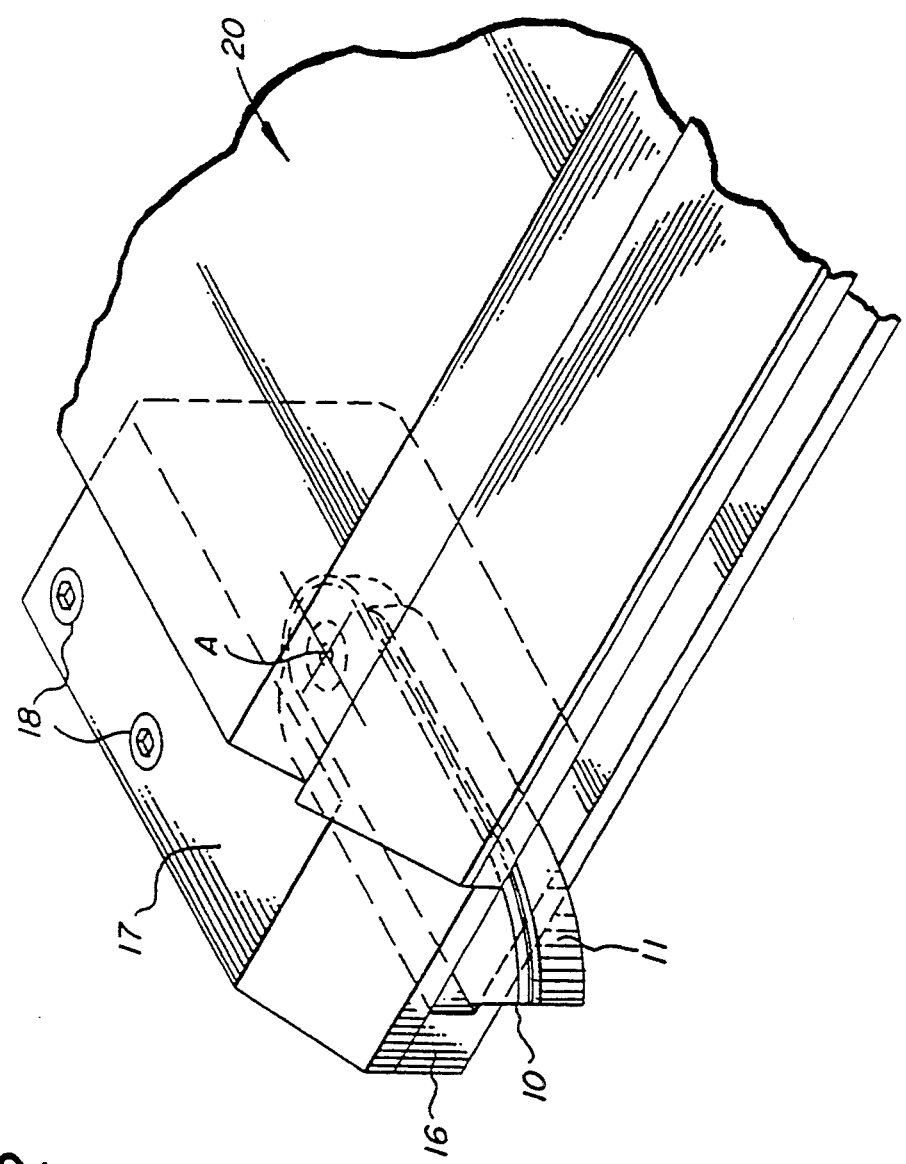
FIG. 2 Perspective drawing of the left hand blocking plate with pivotally mounted arm fully withdrawn.
Figure 3:
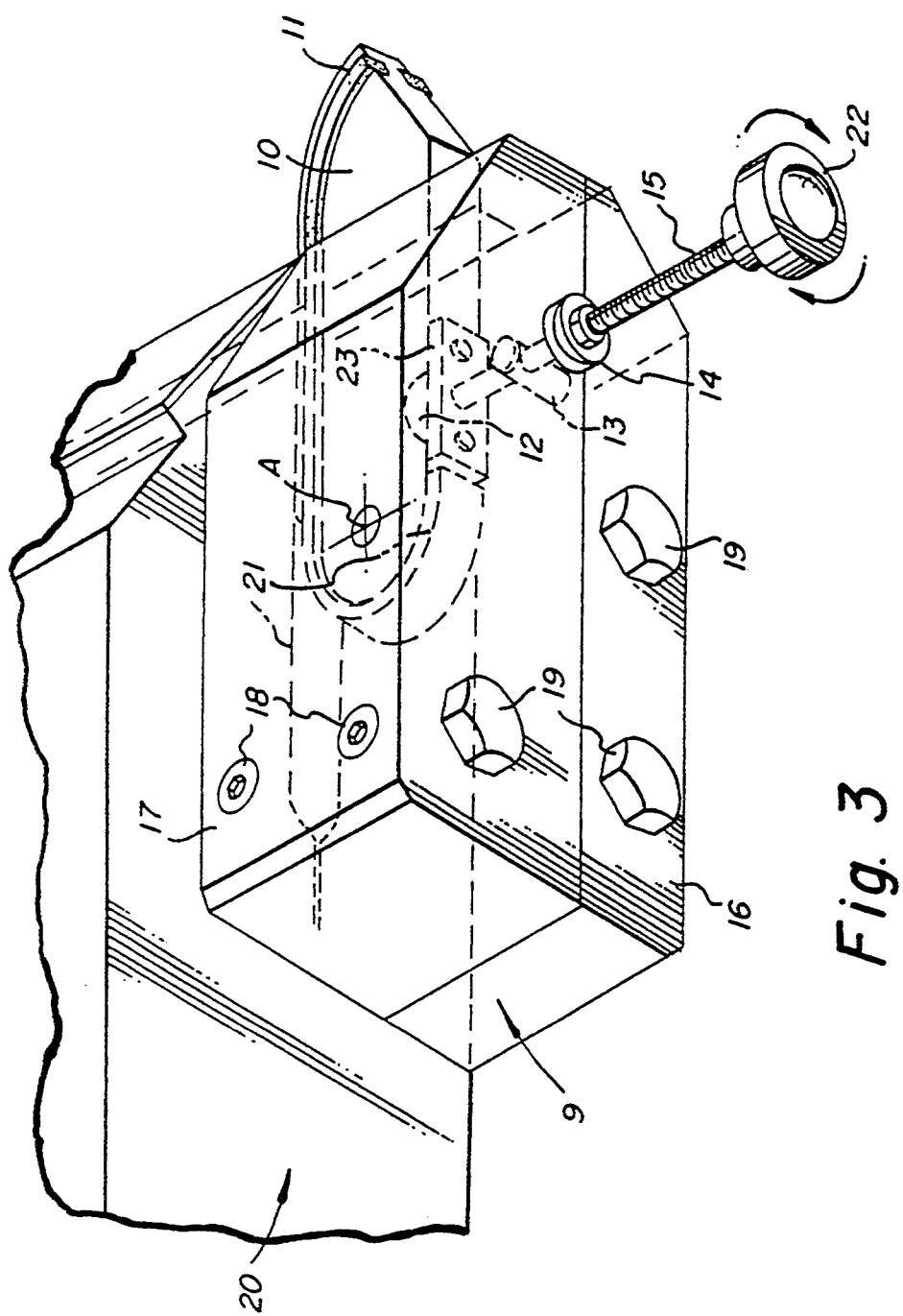
FIG. 3 Perspective drawing of the left hand blocking plate from screw side.
Figure 4:
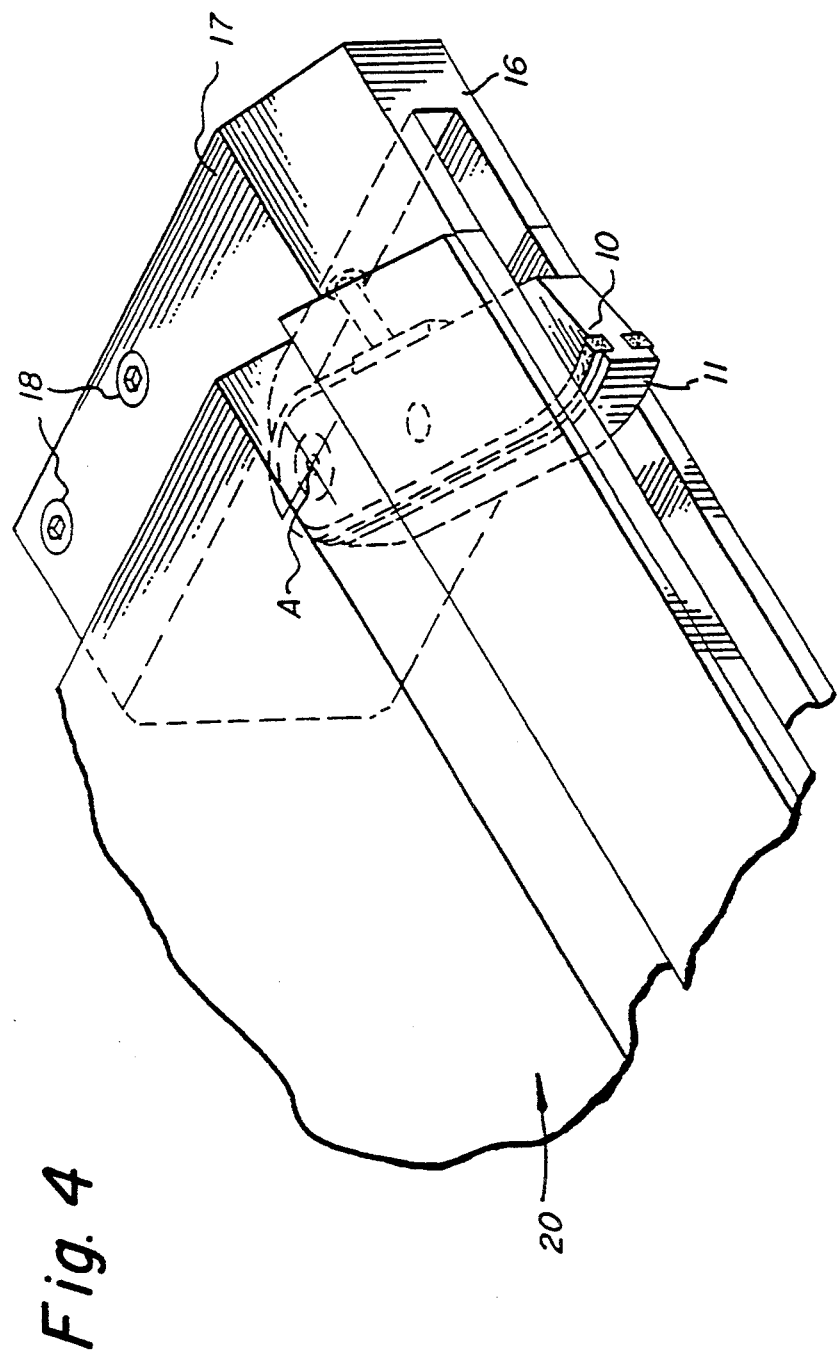
FIG. 4 Perspective drawing of the right hand blocking plate with the pivotally mounted arm partially extended.
Figure 5:
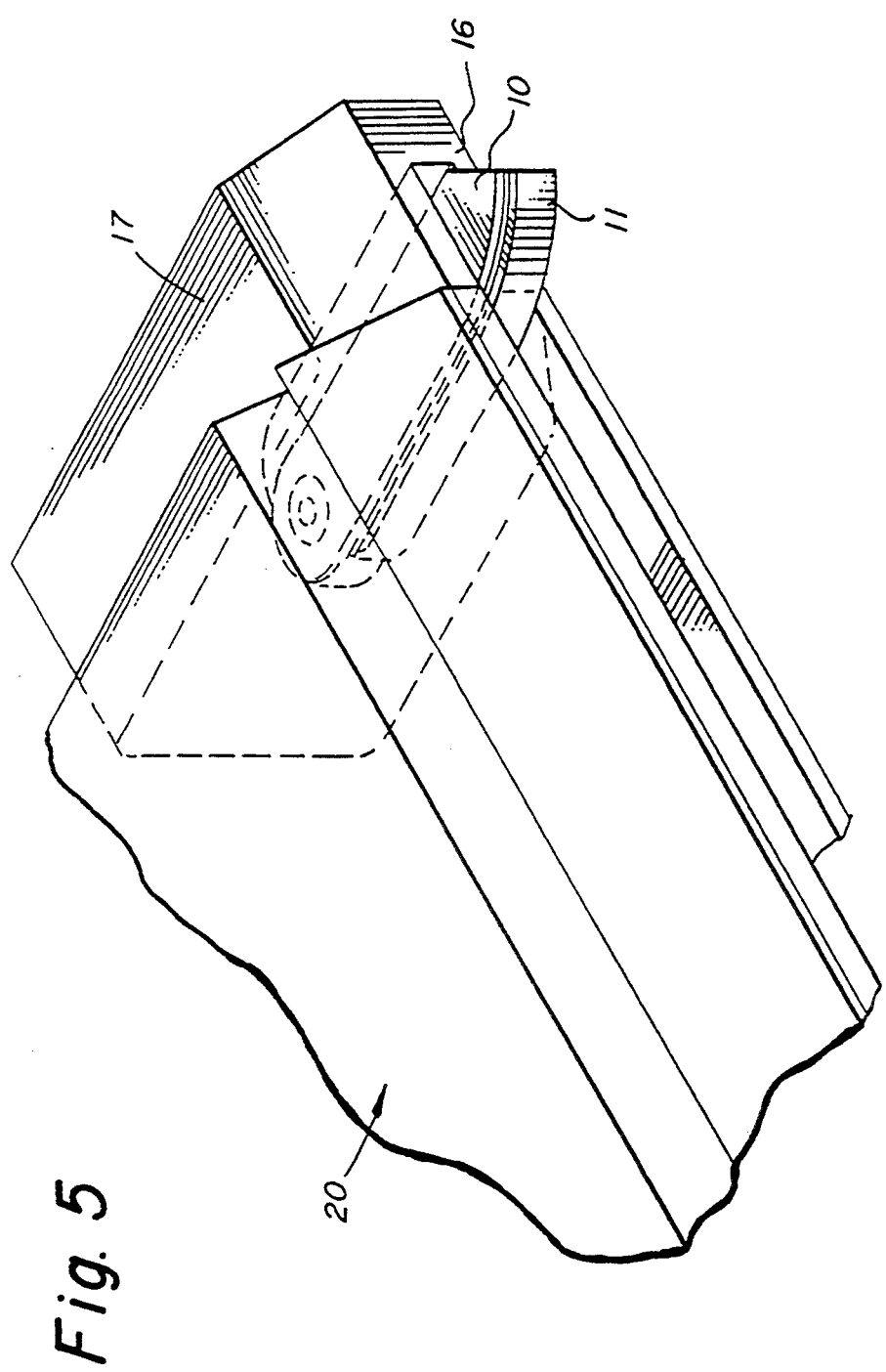
FIG. 5 Perspective drawing of the right hand blocking plate with the pivotally mounted arm fully withdrawn.
Figure 6:
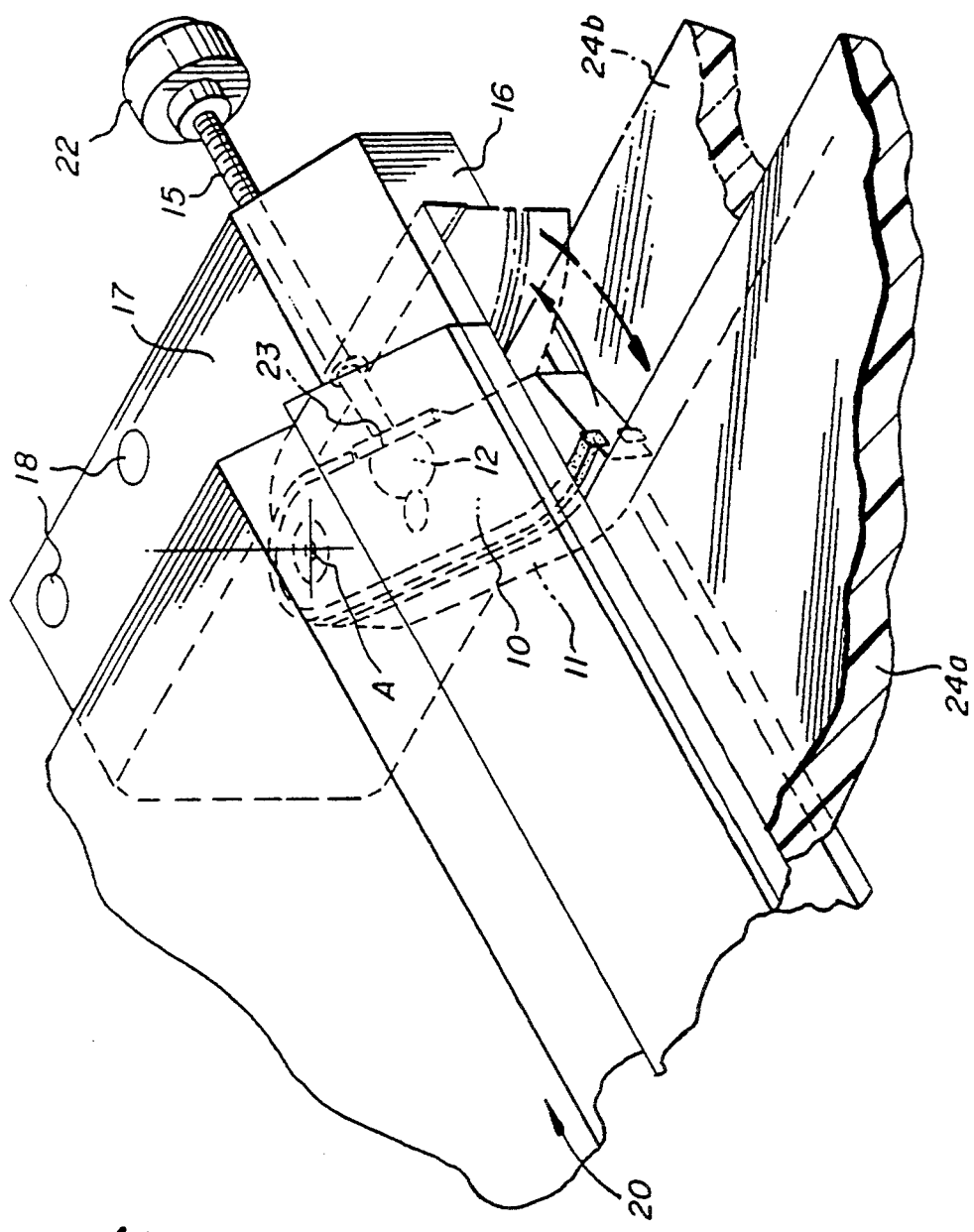
FIG. 6 Perspective drawing of the right hand blocking plate with the pivotally mounted arm shown both partially extended and withdrawn showing the extrusion of variable width plastic sheet.

List of parts shown in the drawings:
Die end block, 9
Pivot arm, 10
Pivot arm seal, 11
Pivot arm ball connector, 12
Rotation pin, 13
Locking nut, 14
Depth adjustment screw, 15
Die end block, rear plate, 16
Die end block, front plate, 17
Die end block fastening bolt, 18
Die end block to extruder fastening bolt, 19
Extruder die, 20
Pivot arm recess, 21
Knob, 22
Fastening plate, 23
Extruded sheet, 24
Narrow extruded sheet 24a
Wide extruded sheet, 24b
Pivot point, A

DETAILED DESCRIPTION OF THE INVENTION

The instant invention improves upon the conventional end blocking plate for extruder dies with a device that enables the width of the extruder die opening to be varied. By varying the width of the extruder die opening through appropriate adjustment of the new end block, the width of extruded materials may be varied according to the adjustment of the end block. Since there are two sides to the extruder, the end block exists in right and left handed forms that are generally mirror images of each other. The instant invention is particularly well suited for those type of extruder dies known in the art as coat hanger dies.

The die end block, 9, for an extruder die comprises a rear plate, 16, fastened by a plurality of fastening bolts, 18, or other suitable fastening means to a front plate, 17, and the entire die end block is a part of the die, 20, which is connected to an extruder. The die end block is attached to the extruder die, 20, by means of a plurality of die block mounting bolts, 19, or other suitable fastening means, said die block containing a recess, 21, in either the rear plate, 16, or the front plate, 17, in which recess is mounted a variably extendible pivotally mounted pivot arm, 10, pivotally mounted on pivoting means said pivoting means being at point A, said pivoting arm, 10, having mounted thereon a pivot arm seal, 11, said pivot arm, 10, being extendible by means of contact with a pivot arm ball connector, 12, said connector being attached at one end, hereafter referred to as its connecting end, to a depth adjustment screw, 15, which screw passes through a fastening plate, 23, said die end block, 9, a rotation pin, 13, and a locking nut, 14, said depth adjustment screw exiting the die end block and terminating in a knob, 22, or other adjustment means. The knob, 22, may extend out from the die end block, 9, or it may be recessed into the die end block, 9; it is sufficient that the knob, 22, be turnable by any suitable means thereby rotating the depth adjustment screw, 15, and variably extending the pivotally mounted pivot arm, 10.

By turning the knob, 22, the depth adjustment screw, 15, rotates as it passes through the locking nut, 14, and the rotation pin, 13, said rotation inserting the screw into the interior of the die end blocking plate recess, 21, wherein said pivot arm ball connector, 12, being held against the pivot arm, 10, by the fastening plate, 23, pivotally moves the pivot arm, 10, and the pivot arm seal, 11, further into the opening or cavity of the extruder die, 20, thereby changing the width of the extruder die opening in an adjustable fashion permitting the extrusion of extrudable materials with variable widths from a single die.

The dimensions of the extruder die, 20, control the dimensions of the die end blocking plate, 9, the functional length of the pivot arm, 10 is controlled by the extent of the width of the extruder die opening and whether one or two devices of the invention are being employed to modify the width of the extrudable material being extruded. For thermoplastic materials that have a low melt strength, the sheet take-up mechanism must be close to the extruder die opening lip, otherwise the newly extruded sheet will sag and deform. In a fully withdrawn position, the pivot arm, 10, may extend beyond the extruder die opening lip, however, an upper limit to the length of the pivot arm, 10, is imposed by the geometry and dimensions of the sheet take-up devices external to the extruder die opening. The requirement that the sheet take-up devices be relatively close to the extruder die opening lip generally prevents the pivot arm, 10, from being a length that would enable the variation of sheet width all the way from zero to the full extent of the extruder die opening.

In the specific embodiment of the invention shown in the drawings, the pivot arm, 10, has a terminal curvature at the end closest to the extruder die lip or opening such that as it is extended into the extruder die opening a tangent on the pivot arm, 10, at the point of the extruder die opening lip would be approximately perpendicular to the extruder die opening lip and generally parallel to the flow of extrudable material being extruded. By approximately perpendicular or generally parallel, applicants intend the term approximately or generally to mean within about 15 degrees, more preferably within about 10 degrees, and most preferably within about 5 degrees. A geometric relationship exists between the length of the pivot arm, 10, and said radius of terminal curvature such that as the arm is extended inward to narrow the sheet width the tangent at the point the pivot arm intersects the extruder die lip or opening is both approximately perpendicular to the die lip and approximately parallel to the flow of material being extruded. When the pivot arm, 10, is fully retracted the sheet extrudable by the die, 20, is at its maximum in terms of width. Depending on the production requirements for a particular extruder, one die end block, 9, containing the pivotally attached arm, 10, may be employed while a conventional blocking plate is utilized on the other side of the die opening, or both sides of the die opening may have attached thereto a right and left hand version respectively of the die end block, 9.

The instant invention may be employed to extrude a wide variety of extrudable materials, varying the width thereof. In a preferred embodiment, the apparatus of the instant invention is utilized to variably control the width of extrudable materials, said extrudable materials being selected from the group consisting of polymethyl acrylate, polyethyl acrylate, polymethyl methacrylate, polyethyl methacrylate, polystyrene, polyacrylonitrile, polyvinyl alcohol, polvinyl chloride, polyacrylamide, poly(2-hydroxyethyl) methacrylate, polydimethylsiloxane, polycarbonate, polyethylene, polypropylene, polybutylene, polyisobutylene, polymethylpentene, and mixtures, alloys, and copolymers thereof. A particular advantage of the instant invention is that sheet width may be varied while operating the extruder as opposed to previous solutions where it was required to shut down the extruder in order to change parts so that the sheet width could be varied. When it is desired to extrude thermoplastic materials or other materials that are normally solid at room temperature, a practitioner having ordinary skill in the art would normally employ either external or internal heaters both around the extruder and the extruder die in order to maintain the material being extruded in a sufficiently plastic or liquid form as to enable extrusion. Since heaters employed to liquefy thermoplastics or other highly viscous materials for extrusion might accelerate the degradation of such material within the extruder or extruder die cavity particularly if such material is sensitive to thermal degradation, the extent of such imposed heating may need to be variably controlled to avoid such degradation. Additionally, it may also be necessary for the protection of temperature sensitive materials to equip the extruder, the extruder die or both with a cooling means that most typically would comprise a circulating fluid coolant system.

These examples of use are not intended to limit the application of the device or the claims appended hereto.

That which is claimed is:

1. An extruder die for extruding extrudable materials comprising an elongated die body, at least one inlet into said die body, an extruder die opening and one or more side locking plates, said side blocking plates comprising a pivotally attached member wherein said pivotally attached member pivots around a pivot point within said side blocking plate and is variably extendible into said extruder die opening thereby variably reducing the width of said extruder die opening in a controllably variable fashion wherein the width of extruded materials is variably controlled.

2. The apparatus of claim 1 wherein the pivot member has a terminal curvature at the end closest to the extruder die lip whereby as the pivot member is extended into the extruder die opening a tangent on the pivot member at the point of the extruder die opening lip would be approximately perpendicular to the extruder die opening lip and generally parallel to the flow of extrudable material being extruded.

3. The apparatus of claim 1 wherein the pivot member has a length whereby when the pivot member fully withdrawn said pivot member extends beyond the extruder die lip opening.

4. The apparatus of claim 1 wherein the pivot member has a length whereby when the pivot member is fully withdrawn said pivot member is within the extruder die lip opening.

5. A method for varying the width of extrudable materials comprising attaching a blocking plate to an extruder die said blocking plate comprising a pivotally attached member wherein said pivotally attached member pivots around a pivot point within said blocking plate and is variably extendible into an extruder die opening thereby variably reducing the width of said extruder die opening in a controllably variable fashion and adjusting the variable extent of said pivotally attached member to variably control the width of extruded material.

6. The method of claim 5 which further comprises protecting a thermally sensitive extrudable material by cooling means.

7. The method of claim 5 which further comprises maintaining the extrudable material in an extrudable state by means comprising a heater.

8. The method of claim 7 which further comprises protecting a thermally sensitive extrudable material by cooling means.

9. The method of claim 5 wherein the extrudable material comprises a material selected from the group consisting of polymethyl acrylate, polyethyl acrylate, polymethyl methacrylate, polyethyl methacrylate, polystyrene, polyacrylonitrile, polyvinyl alcohol, polvinyl chloride, polyacrylamide, poly(2-hydroxyethyl) methacrylate, polydimethylsiloxane, polycarbonate, polyethylene, polypropylene, polybutylene, polyisobutylene, polymethylpentene, and mixtures, alloys, and copolymers thereof.

10. The method of claim 9 wherein the extrudable material is a material comprising a polycarbonate.

* * * * *